United States Patent
Torok et al.

(10) Patent No.: US 11,804,222 B2
(45) Date of Patent: Oct. 31, 2023

(54) SYSTEM AND METHOD FOR CONTROLLING JOBSITE PRODUCTS

(71) Applicant: BLACK & DECKER INC., New Britain, CT (US)

(72) Inventors: Jeremy J. Torok, Sparks, MD (US); Danh T. Trinh, Towson, MD (US); Daniele C. Brotto, Parkville, MD (US); Matthew Ian Barrett, Essex, MD (US); Geoffrey S. Howard, Columbia, MD (US); Edward D. Smith, Eldersburg, MD (US); Paul S. White, Fallston, MD (US)

(73) Assignee: BLACK & DECKER INC., New Britain, CT (US)

( * ) Notice: Subject to any disclaimer, the term of this patent is extended or adjusted under 35 U.S.C. 154(b) by 679 days.

(21) Appl. No.: 16/515,099

(22) Filed: Jul. 18, 2019

(65) Prior Publication Data
US 2020/0027458 A1    Jan. 23, 2020

Related U.S. Application Data

(60) Provisional application No. 62/700,476, filed on Jul. 19, 2018.

(51) Int. Cl.
*G10L 15/30* (2013.01)
*G10L 15/22* (2006.01)
*B25F 5/00* (2006.01)

(52) U.S. Cl.
CPC ............... *G10L 15/22* (2013.01); *B25F 5/00* (2013.01); *G10L 15/30* (2013.01); *G10L 2015/223* (2013.01); *G10L 2015/225* (2013.01)

(58) Field of Classification Search
CPC .................. G10L 15/30; G10L 2015/223
See application file for complete search history.

(56) References Cited

U.S. PATENT DOCUMENTS 4,776,016 A * 10/1988 Hansen ............... G06F 3/16
                                                         381/110
9,112,993 B1    8/2015 Rivera
(Continued)

FOREIGN PATENT DOCUMENTS

CN    105163236 A    12/2015
CN    106548792 A    3/2017
(Continued)

*Primary Examiner* — Feng-Tzer Tzeng
(74) *Attorney, Agent, or Firm* — Adan Ayala

(57) ABSTRACT

An electronic device with a microphone, a speaker, a processor, and a power tool battery pack connectable to and powering the speaker and the processor. The electronic device has software that can cause the processor to perform operations which can cause the electronic device to operate in first and second modes. While the electronic device is operating in the first mode, the device can generate first audio data representing user speech captured by the microphone which can be analyzed by the electronic device or a remote server. The electronic device can switch from operating in the first mode to operating in a second mode, where the electronic device can receive, second audio data from another electronic device. The electronic device can then output, using the speaker, audible content represented by the second audio data.

20 Claims, 4 Drawing Sheets

(56) References Cited

U.S. PATENT DOCUMENTS

| | | | |
|---|---|---|---|
| 2015/0287413 A1* | 10/2015 | Jung | ................ G10L 15/32 |
| | | | 704/231 |
| 2017/0093510 A1* | 3/2017 | Lin | ................ H04W 76/10 |
| 2018/0121432 A1 | 5/2018 | Parson et al. | |

FOREIGN PATENT DOCUMENTS

| | | | | |
|---|---|---|---|---|
| CN | 108076414 A | 5/2018 | | |
| CN | 108093348 A | 5/2018 | | |
| CN | 108159687 A | 6/2018 | | |
| CN | 108196465 A | 6/2018 | | |
| EP | 0850673 A1 * | 7/1998 | ............ | A63F 13/10 |
| WO | 2018113672 A1 | 6/2018 | | |

* cited by examiner

SYSTEM AND METHOD FOR CONTROLLING JOBSITE PRODUCTS

CROSS-REFERENCE TO RELATED APPLICATION

This application derives priority from U.S. Patent Application No. 62/700,476, filed on Jul. 19, 2018, entitled "SYSTEM AND METHOD FOR CONTROLLING JOBSITE PRODUCTS," and fully incorporated herein by reference.

FIELD OF INVENTION

The present invention relates to computer data network systems, in which different products, including power tools and other construction jobsite products, are connected by means of wireless signal transmissions for tracking and/or controlling thereof.

BACKGROUND OF THE INVENTION

Location systems are used for locating, and preferably tracking, articles. Location systems are used in a wide range of environments, including hospitals and other healthcare situations, social care environments, prisons, industrial locations, warehouses, retail stores, educational institutions, offices and logistics environments, for example. Such systems are used for locating and tracking patients (especially babies and the elderly) and other categories of people, and for locating and tracking medical supplies, equipment, products, tools and other categories of articles.

Such location systems have not been implemented in construction jobsites due to the lack of network infrastructure, the lack of durable network components, and the inability to provide a temporary network that is easily assembled at the beginning or the construction project and disassembled after the construction project has been completed. Such location system is described in U.S. Patent Application Ser. No. 62/370,292, filed on Aug. 3, 2016, entitled "CONSTRUCTION JOBSITE COMPUTER DATA NETWORK AND LOCATION SYSTEM," and PCT Application No. PCT/US2017/045222, filed on Aug. 3, 2017, entitled "CONSTRUCTION JOBSITE COMPUTER DATA NETWORK AND LOCATION SYSTEM," which are hereby fully incorporated by reference.

DESCRIPTION OF THE DRAWINGS

Preferred embodiments of the invention will now be described, by way of example, with reference to the accompanying drawings, of which.

DETAILED DESCRIPTION

Figure 1:
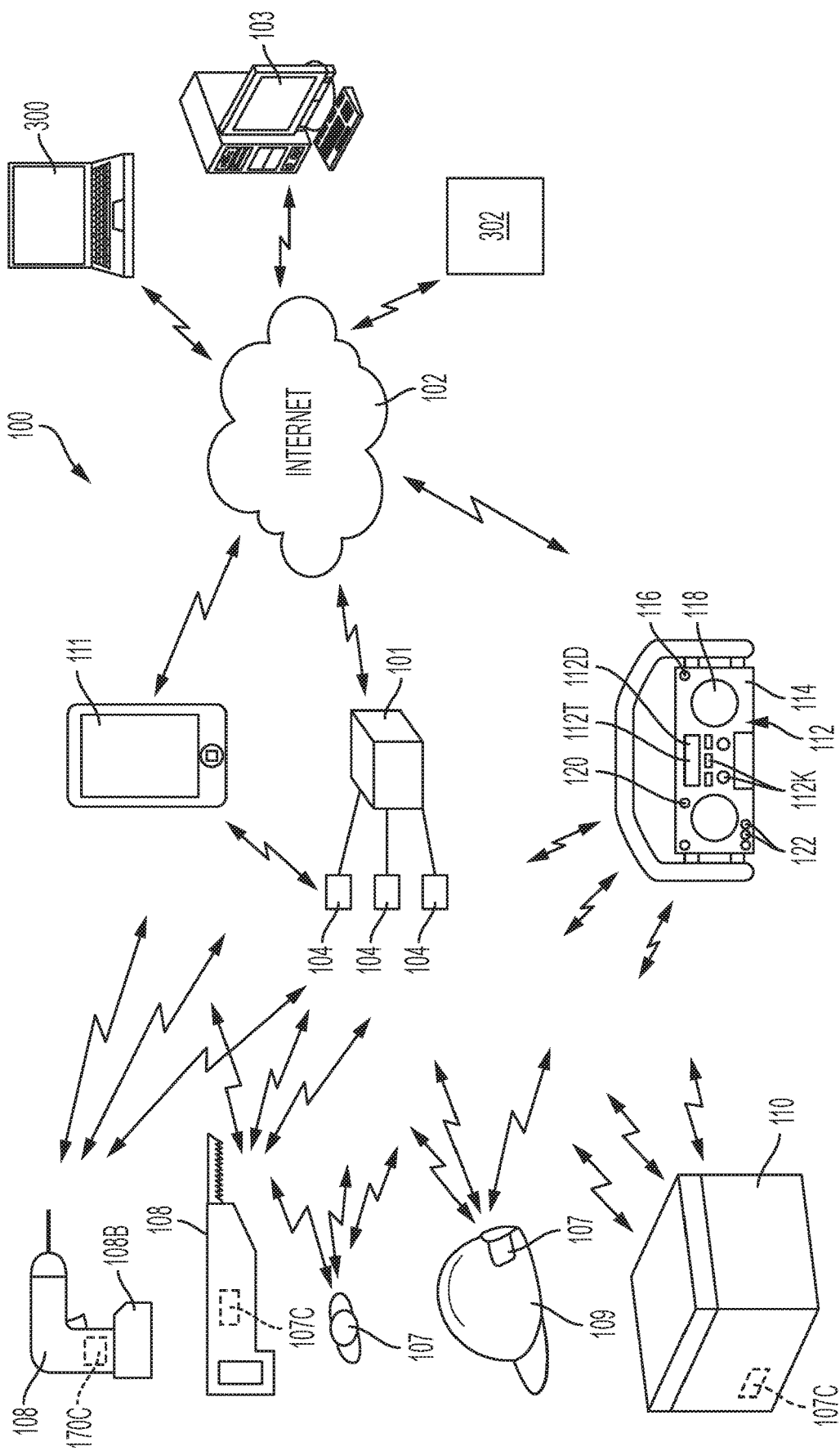
FIG. 1 is a system diagram of a computer network.

FIG. 1 illustrates a computer network 100 for a construction jobsite. The computer network 100 preferably includes a local router or server 101 disposed in the construction jobsite connected to the internet 102. Persons skilled in the art will recognize that local server 101 is preferably connected to the internet 102 via at least one of the following connections: digital subscriber lines (DSL), asymmetric digital subscriber lines (ADSL), symmetric digital subscriber lines (SDSL), very high digital subscriber lines (VDSL), cable-broadband internet connection, wireless broadband connection, T-1 lines, bonded T-1 lines, T-3 lines, optical carrier lines (OC3), internet over satellite (IoS), etc.

Computer network 100 may also include network access transceivers 104. Transceivers 104 may be connectable to the local server 101 via a wired connection, such as an Ethernet network, and/or one or more of a variety of wireless technologies, including: wireless local area network (WLAN) technologies; wireless personal area network (WPAN) technologies (including low-rate wireless personal area network (LR-WPAN) technologies); radio frequency identification (RFID); ultra-wideband (UWB); ultrasound; sound; infrared; visible light; camera vision, etc. Included in WLAN technologies are those conforming to the Institute of Electrical and Electronics Engineers (IEEE) 802.11 series of standards (e.g. Wi-Fi™). Included in WPAN and LR-WPAN technologies are those conforming to the IEEE 802.15 series of standards (e.g. Bluetooth™, ZigBee™, etc.).

Such different wireless communication circuits allow transceiver 104 to communicate with different devices, such as computer 300, personal computing devices (such as tablets or smartphones 111), and tags 107 disposed in or attached to an asset, such as a power tool 108, a wearable item 109 (such as a vest or helmet) worn by a worker, and/or a construction material 110 (such as boards, pipes, slabs, etc.), etc. Persons skilled in the art will recognize that power tool 108, a battery pack 108B attached to the power tool 108, wearable item 109 and/or the construction material 110 may have a communication circuit 107C disposed within, which would interacting with transceiver 104 in the same manner as tag 107, while preferably providing further features and advantages as described in US Patent Publication No. 2014/0107853, entitled "SYSTEM FOR ENHANCING POWER TOOLS," which is hereby fully incorporated by reference. Communication circuits 107C may allow communication therebetween, for example, between battery pack 108B and the power tool 108 the battery pack 108B is powering, with another power tool 108 that the battery pack 108B is not connected to.

Persons skilled in the art will recognize that smartphones 111, communication circuits 107C and tags 107 may use more than one communication protocol to communicate with transceiver 104. For example smartphone 111 may communicate with transceiver 104 via a Bluetooth circuit and a WLAN/Wi-Fi circuit, etc. Similarly, communication circuit 107C and/or tag 107 may communicate with transceiver 104 via a Bluetooth circuit and WLAN/Wi-Fi circuit, etc. Persons skilled in the art are referred to U.S. Pat. No. 9,357,348, which is hereby fully incorporated by reference, for further information on the functionality and components of tag 107.

With such arrangement, information can be passed along between tags 107, power tool 108, battery pack 108B, wearable item 109 and/or the construction material 110 to a central server 103, which is connected to the internet 102.

Computer network 100 may also include a portable music device 112. The music device 112 comprises a housing 114 that supports at least one microphone 116, one or more speakers 118, and a talk button 120. The talk button 120 may also be referred to as a talk actuator or a push-to-talk (PTT) button.

The portable music device 112 may be connectable to the internet 102 via a wired connection, such as an Ethernet network connected to via an Ethernet circuit 325 and/or one or more of a variety of wireless technologies, including: wireless local area network (WLAN) technologies; wireless personal area network (WPAN) technologies (including low-rate wireless personal area network (LR-WPAN) technologies); radio frequency identification (RFID); ultra-wideband (UWB); ultrasound; sound; infrared; visible light; camera vision, etc. Included in WLAN technologies are those conforming to the Institute of Electrical and Electronics Engineers (IEEE) 802.11 series of standards (e.g. Wi-Fi™). Included in WPAN and LR-WPAN technologies are those conforming to the IEEE 802.15 series of standards (e.g. Bluetooth™, ZigBee™, etc.).

The music device 112 may be designed and configured to rest horizontally on a surface, with the speakers 118 preferably facing a user. In addition, the device 112 may be designed for handheld use during which a user holds the device 112 and speaks into the microphone 116 while pressing the talk button 120. The music device 112 may be configured so that the talk button 120 is easily accessed by a user's thumb when holding the music device 112 near the user's mouth.

The microphone 116 may be selected and/or designed for sensitivity to audio so as to capture user speech. The microphone 106 generates an audio signal that contains the user speech. Persons skilled in the art shall recognize that microphone 116 may be selected for sensitivity to near-filed audio and/or far-field audio according to the expected uses of portable music device 112.

The portable music device 112 may be powered by a rechargeable internal battery 318 (FIG. 2) for cordless operation. The device 112 may have contacts or ports 122 that can receive external power by means of a charging dock or cradle in order to charge the internal battery and/or to operate from household power mains. Information on such charging dock may found in U.S. Pat. No. 9,865,259, which is hereby fully incorporated by reference. Portable music device 112 may also be powered by a battery pack 108B removably connected to portable music device 112 and/or external AC power.

The device 112 may have knobs, buttons 112K or other controls in addition to the talk button 110, such as a power button, volume buttons, play control buttons, etc. In some cases, the music device 112 may have LEDs or lights 112L and/or a graphics display 112D for presentation of information to the user. Display 112D may include a touch screen input 112T. Persons skilled in the art shall recognize that a touch screen input 112T may be provided in addition to the touch screen input of display 112D and/or adjacent to display 112T.

The portable music device 112 is configured to capture and respond to user speech. Specifically, the user may verbally request particular music to be played by the portable music device 112. The portable music device 112 responds to the request by playing the music on the speakers 118. In certain situations, the user may need to press the talk button 120 when speaking a request.

In other cases, the user may indicate a request by prefacing the request with a predefined keyword, which is also referred to herein as a wakeword or trigger expression. More specifically, the music device 112 may rely on the talk button to detect spoken user requests when the music device 112 is operating from battery power and may enable wakeword detection only when the music device 112 is receiving external AC power. Disabling wakeword detection when operating on battery power reduces computational activities and power consumption, thereby increasing battery life.

The portable music device 112 may be supported by network-based services such as speech support services that perform automatic speech recognition (ASR) and natural language understanding (NLU) on audio captured by the microphone 116 and that provide instructions to the portable music device 112 in response to recognized speech. This allows relatively sophisticated audio and speech processing to be performed despite limited processing capabilities of the portable music device 112 itself.

The portable music device 112 may have at least limited speech recognition capabilities. Such speech recognition capabilities are preferably activated and utilized when the portable music device 112 is receiving external power. In various embodiments, different levels of speech support may be provided by the device 112 when receiving external power, such as ASR, NLU, and speech synthesis. Performing these functions locally avoids delays and latencies that may otherwise be introduced by interacting with network-based services.

The portable music device 112 may be configured to operate in multiple playback modes to play audio content such as music and in some cases to also control the playing of audio content by peripheral devices. In one playback mode, the portable music device 112 acts as a peripheral speaker for a personal computing device such as a smartphone 111, tablet computer, or other device that may be configured to act as a personal media storage device.

In this mode, referred to as a peripheral mode, the device 112 preferably receives an audio stream over a device-to-device wireless connection such as a Bluetooth® connection and passively plays the received audio stream on the speakers 118. The audio stream may contain music or other audio content that has been selected through a user interface of the personal media device, apart from the speech interface of the portable music device 112.

In another playback mode, referred to herein as a voice control mode, the portable music device 112 preferably implements a speech interface through which the user selects and plays music by speaking commands to the device 112. In some embodiments, the voice control mode is used only during those times during which the device 112 has Internet connectivity, preferably broadband Internet connectivity. During other times, the portable music device operates in the peripheral mode.

When operating in the voice control mode, the user may speak a verbal command into the microphone 116 while or after actuating the talk button 120. The user speech is analyzed and interpreted to identify particular music or other audio content that the user wants to play. The identified content is then obtained and/or played by the device 112. During times when the portable music device 112 is receiving external power, the user may preface a verbal command with a wakeword and may not need to press the talk button 120. (Alternatively, users may program portable music device 112 to require activation of talk button 120 during certain times, while allowing activation with a wakeword at other certain times.)

By default, content identified in this manner is played on the speakers 118 of the device 112. However, the device 112 may also be configured to provide the content to available peripheral devices such as Bluetooth speakers or other speaker peripherals that are nearby.

Figure 2:
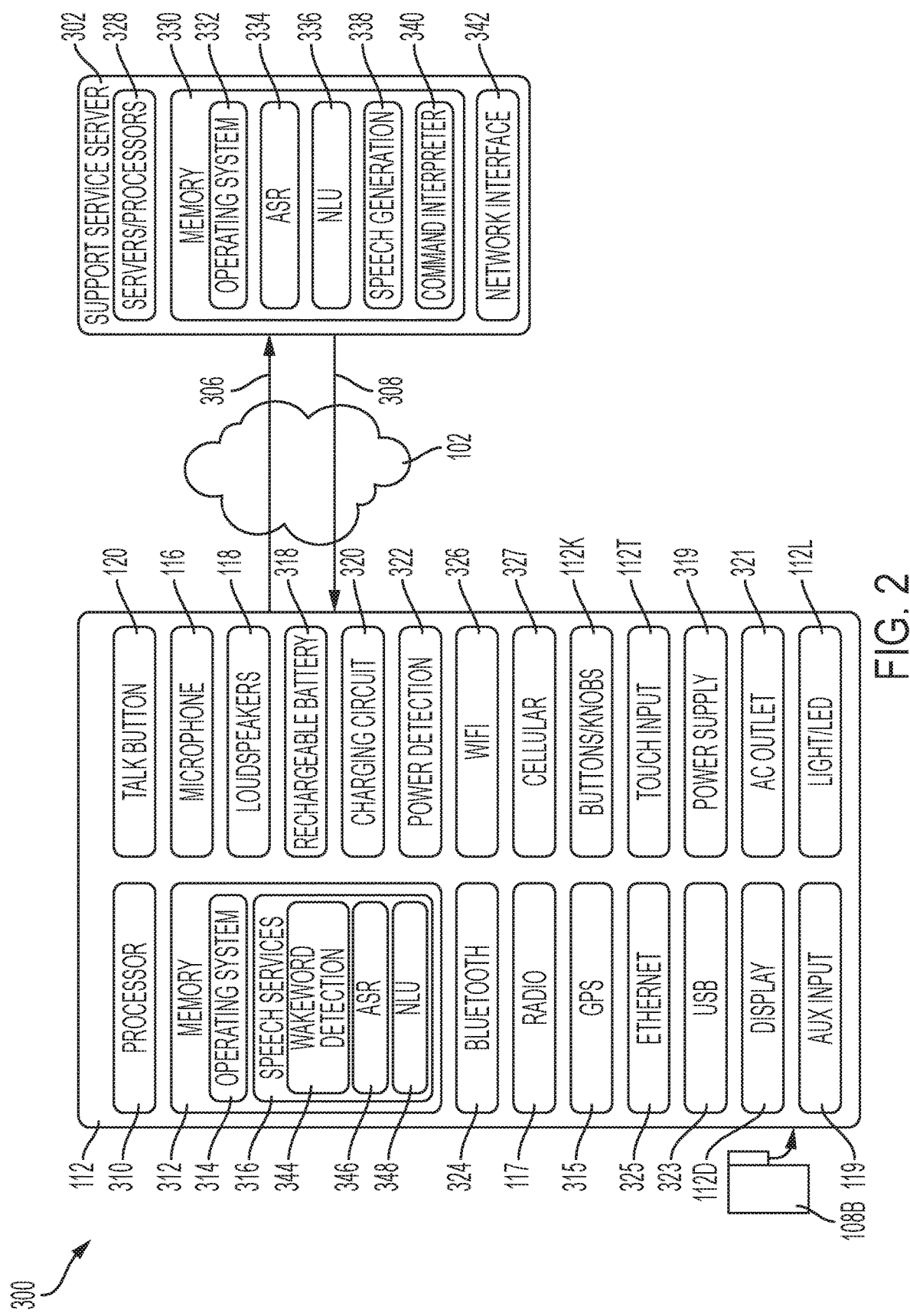
FIG. 2 shows an example of a portable music device that implements a speech interface.

As seen in FIGS. 1-2, a network-accessible speech support service server 302 may be implemented as a network-based or cloud-based service that is located remotely or external to the portable music device 112. For example, the speech support service server 302 may be implemented by a business organization and/or service provider to support multiple music devices 112 that are located in different user premises, which in turn may be located in widely varying geographic locations.

The speech support service server 302 may in some instances be part of a network-accessible computing platform that is maintained and accessible via a wide-area network 102 such as the Internet. Network-accessible computing platforms such as this may be referred to using terms such as "on-demand computing", "software as a service (SaaS)", "platform computing", "network-accessible platform", "cloud services", "data centers", and so forth.

Communications between the music device 112 and the speech support service server 302 may be implemented through one or more data communication networks, including local-area networks, wide-area networks, and/or the public Internet. Cellular and/or other wireless data communications technologies may also be used to communicate with the speech support service server 302. User premises may include local network support equipment to facilitate communications with the speech support service server 302, such as wireless access points, network routers, communication hubs, etc.

In operation, the portable music device 112 preferably provides an audio signal 306 to the speech support service server 302 in response to a user of the device 112 pressing the talk button 120. The speech support service server 302 analyzes the audio signal 306 to detect user speech, to determine the meaning of the user speech, and to provide a response signal 308 that contains or indicates an appropriate response to the meaning of the user speech. The response signal 308 may indicate actions or functions that the portable music device 112 is to perform. Alternatively, or in addition, the response signal 308 may comprise an audio signal containing audio that is to be rendered by the portable music device 112. For example, the audio may comprise generated speech or requested audio content such as music.

The portable music device 112 has operational logic, which in the illustrated example comprises a processor 310 and associated memory 312. The processor 310 may include multiple processors and/or a processor having multiple cores. The processor 310 may comprise processor extensions, co-processors, digital signal processors, codecs, and so forth.

The memory 312 may contain applications and programs in the form of computer-executable instructions that are executed by the processor 310 to perform acts or actions that implement desired functionality of the device 112, including the functionality described herein. The memory 312 may be a type of computer storage media and may include volatile and nonvolatile memory. The memory 312 may include, but is not limited to, RAM, ROM, EEPROM, flash memory, or other memory technology.

FIG. 2 shows examples of applications and/or programs that may be provided by the device 112 and stored by the memory 312 to implement functionality of the device 112, although many other applications and types of functionality may be provided in various embodiments. For example, the portable music device 112 may have an operating system 314 that is configured to manage hardware and services within and coupled to the device 112 and to implement the general functionality of the device 112 as described herein. In some embodiments, the memory 312 may also contain programs or applications that implement local speech services 316, which may be used at times, especially during times when the device 112 is connected to an external power source. The nature and use of the local speech services 316 will be explained in more detail below.

The device 112 has a charging circuit 320 that receives electrical power from an external source such as a power mains, an AC-to-DC converter connected to the power mains, or an external DC source. The charging circuit 320 is configured to charge the rechargeable battery 318 and/or battery pack 108B when the device 112 receives external power.

The portable music device 112 may also have a power detector 322 that detects when the device 112 is receiving external electrical power and/or when the device 112 is charging the rechargeable battery 318 and/or battery pack 108B. The power detector 322 may be configured to produce a signal to indicate that the portable music device 112 is receiving external power and is charging the rechargeable battery 318 and/or battery pack 108B.

Such signal can be used to automatically select which power source shall be used to power music device 112. For example, such signal can be used to trigger a switch, transistor or relay to select the DC power from battery pack 108B instead of the external AC power, or vice versa. Persons skilled in the art shall recognize that relays can be used to automatically switch between the DC power from battery pack 108B and the external AC power, as disclosed in U.S. Pat. No. 8,199,858, which is fully incorporated by reference. Such switches, transistors and/or relays can be part of power supply circuit 319. Diodes may also be used in the power path from the battery pack 108B and/or external AC power, to ensure the highest voltage from either input is the one provided to power music device 112.

At least one additional AC outlet 321 may be connected to power supply circuit 319 to provide AC power to other devices. Such AC outlet(s) 321 may be controllable by voice command. In other words, the user may activate or disactivate at least one of the AC outlet(s) 321 by voice command, as further explained below.

The portable music device 112 may have a device-to-device wireless communications interface, which in the illustrated embodiment comprises a Bluetooth® personal-area-networking (PAN) interface 324. The Bluetooth interface 324 may be used by the portable music device 112 to communicate with local devices such as smartphones 111, personal media devices, and other content sources or audio peripherals.

The portable music device 112 may also have a wireless wide-area network (WAN) communications interface such as a WiFi® interface 326. The WiFi interface 326 may be configured to communicate over the wide-area network 102 with the speech support service server 302. Persons skilled in the art shall recognize that Wifi interface 326 may enable music device 112 to function as a Wifi router/hotspot.

More generally, the portable music device 112 and/or the speech support service server 302 may communicatively couple to the wide-area network 102 via radio frequency (RF) networks, such as mobile telephone/cellular networks, accessed through a cellular communication circuit 327, satellite communication circuit (not shown), Bluetooth® interface 324, Wi-Fi interface 326, or other connection technologies. The network 102 is representative of any type of communication network, including data and/or voice network, and may be implemented using wired infrastructure (e.g., coaxial cable, fiber optic cable, etc.), a wireless infrastructure (e.g., RF, cellular, microwave, satellite, Bluetooth®, Wi-Fi, etc.), and/or other connection technologies.

Persons skilled in the art shall recognize that cellular data network communication circuit 327 can connect portable music device 112 to a cellular data network, and upload data to a cloud service or central server 103. Cellular data network communication circuit 327 may include, but is not limited to Code Division Multiple Access (CDMA), Time Division Multiple Access (TDMA), or other wireless technologies, via Packet Cellular Network (PCN), Global System for Mobile Communications (GSM), Generic Packet Radio Services (GPRS), network/Personal Communications Services network (PCS), a Cellular Digital Packet Data (CDPD), Long Term Evolution (LTE), and/or other wireless interfaces.

The speech support service server 302 preferably comprises operational or control logic, which may comprise one or more servers, computers, and/or processors 328 and associated memory 330 containing applications and programs in the form of instructions that are executed by the servers, computers, or processors 328 to perform acts or actions that implement desired functionality of the speech support service server 302, including the functionality specifically described herein. The memory 330 may be a type of computer storage media and may include volatile and non-volatile memory. Thus, the memory 330 may include, but is not limited to, RAM, ROM, EEPROM, flash memory, or other memory technology. In certain implementations, the speech support service server 302 may comprise a plurality of servers configured to support and communicate with multiple portable music devices 102 over the Internet.

The speech support service server 302 may have an operating system 332 that is configured to manage components and services of the speech support service server 302. Among other software components that are not shown, the speech support service server 302 may include an automatic speech recognition (ASR) service 334 that recognizes human speech in an audio signal provided by the portable music device 112 from the microphone 106. Software of the speech support service server 302 may also include a natural language understanding (NLU) service 336 that determines user intent based on user speech that is recognized by the ASR service 334.

The ASR service 334 may use various techniques to create a transcript of spoken words represented in an input audio signal. For example, the ASR service 334 may reference various types of models, such as acoustic models and language models, to recognize words of speech that are represented in an audio signal. In some cases, models such as these are created by training, such as by sampling and manually classifying many different types of speech.

An acoustic model may represent speech as a series of vectors corresponding to features of an audio waveform over time. The features may correspond to frequency, pitch, amplitude, and time patterns. Statistical models such as Hidden Markov Models (HMMs) and Gaussian mixture models may be created based on large sets of training data. Models of received speech are then compared to models of the training data to find matches.

Language models describe things such as grammatical rules, common word usages and patterns, dictionary meanings, and so forth, to establish probabilities of word sequences and combinations. Analysis of speech using language models may be dependent on context, such as the words that come before or after any part of the speech that is currently being analyzed.

ASR may provide recognition candidates, which may comprise words, phrases, sentences, or other segments of speech. The candidates may be accompanied by statistical probabilities, each of which indicates a "confidence" in the accuracy of the corresponding candidate. Typically, the candidate with the highest confidence score is selected as the output of the speech recognition.

The NLU service 336 analyzes a word stream provided by the ASR service 334 and produces a representation of a meaning of the word stream. For example, the NLU service 336 may use a parser and associated grammar rules to analyze a sentence and to produce a representation of a meaning of the sentence in a formally defined language that conveys concepts in a way that is easily processed by a computer. For example, the meaning may be semantically represented as a hierarchical set or frame of slots and slot values, where each slot corresponds to a semantically defined concept. Thus, the meaning of the sentence may be semantically represented by the frame of slots and slot values. NLU may also use statistical models and patterns generated from training data to leverage statistical dependencies between words in typical speech.

Software elements of the speech support service server 302 may further comprise a speech generation service 338 that synthesizes or otherwise produces speech audio. For example, the speech generation service 338 may comprise a text-to-speech (TTS) component that produces speech from text to produce speech messages to be played at the portable music device 112.

Software of the speech support service server 302 may also comprise a command interpreter and action dispatcher 340 (referred to herein simply as a command interpreter 340) that determines functions or commands corresponding to user intents. In some cases, commands may correspond to functions that are to be performed at least in part by the portable music device 112, and the command interpreter 340 may in those cases provide commands to the portable music device 112 for implementing such functions. Examples of commands or functions that may be performed by the portable music device 112 in response to directives from the command interpreter 340 include playing music or other media, increasing/decreasing the volume of the speakers 108, generating audible speech through the speakers 108, and so forth.

The speech support service server may also comprise a network interface 342 configured to communicate with the portable music device 112 over the wide-area network 102.

Figure 3:
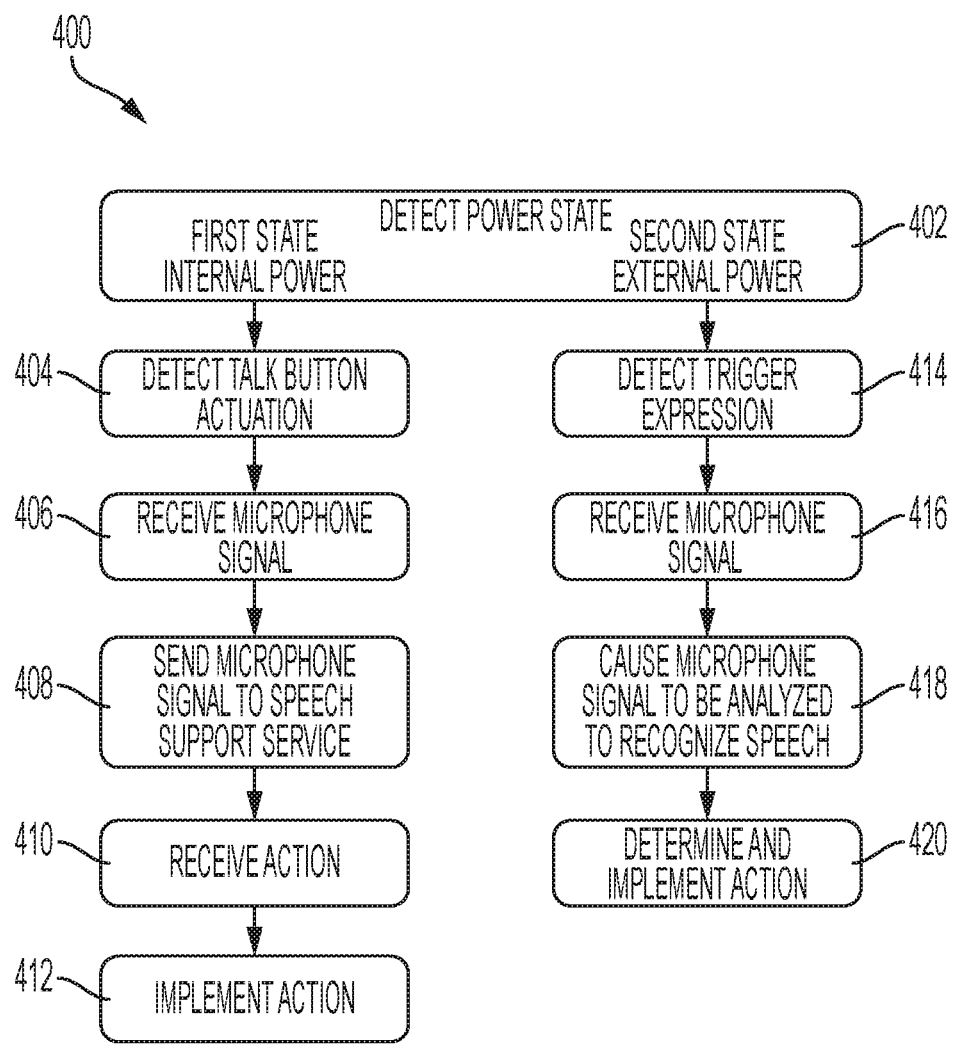
FIG. 3 is a block diagram showing the example portable music device being used with the support of a speech support service server.

In some cases the speech support service server 302 may conduct dialogs with a user of the portable music device 112 to determine the intent of a user. Generally, a speech dialog comprises a sequence of speech questions, answers, and/or statements pertaining to a particular action or intent of the user. More specifically, a speech dialog may comprise a series of speech expressions that may include utterances by the user and speech messages generated by the speech support service server 302. A speech dialog, for example, may begin upon an initial user utterance. The speech support service server 302 may respond with a speech message, such as "what do you want to do?" The user may respond by making a statement in answer to the question. This process may iterate until the speech support service server 302 is able to determine a specific action to take or function to invoke. In the implementation of FIG. 3, the speech expressions are conveyed as audio signals between the portable music device 112 and the speech support service server 302.

In embodiments described herein, the portable music device 112 is designed to play music in response to commands spoken by a user. For example, the user might press the talk button 110 and state "Play music by the Beatles." The user utterance is provided as an audio stream 306 to the speech support service server 302, which performs speech recognition and natural language understanding to determine the meaning of the user utterance. In response to the user utterance, the speech support service server 302 instructs the portable music device 112 to play music by the Beatles. In some cases, as mentioned above, the speech support service server 302 may conduct a two-directional speech dialog with the user to further refine the intent of the user, such as to determine a specific track that the user wants to hear. Upon fully defining the user intent, the speech support service server 302 instructs the portable music device 112 to play the desired track. In response to being instructed to play a particular audio selection, the portable music device 112 obtains the audio selection from a designated source, which may include network-accessible music services, local media storage, local music peripherals, etc. Alternatively, the speech support service server 302 may provide the audio selection as an audio stream to the portable music device 112.

In certain embodiments, the portable music device 112 may be configured to activate and utilize its own speech services 316 rather than the speech services of the speech support service server 302. In particular, the portable music device 112 may be configured to detect situations in which it is receiving external electrical power and may utilize one or more of its local speech services 316 in these situations. For example, speech services 316 may be used when music device 112 cannot access the speech support service server 302.

Speech services 316 may also be used for wakeword detection. In particular, the local speech services 316 may include a wakeword detection component 344. The wakeword detection component 344 may comprise a keyword detector that is configured to continuously monitor and audio signal from the microphone 106 to detect user utterances of a preselected keyword or wakeword, which is more generally referred to herein as a trigger expression. The trigger expression may comprise a keyword, a wakeword, an expression, a phrase, or some other sound or utterance that has been designated as indicating an intent by the user to direct speech to the portable music device 112. Such wakeword may include a power tool or hand tool brand such as "Stanley," "Black & Decker," "DeWalt," "Porter-Cable," "Craftsman," "Irwin," "Milwaukee," "Ridgid," "Makita," "Hitachi," "Metabo," "Bosch," "Skil," "SkilSaw," "Husky," "Kobalt," "Ryobi," "Fein," "Stihl," "Husqvarna," etc.

The wakeword detection component 344 may be implemented using keyword spotting technology. A keyword spotter is a functional component or algorithm that evaluates an audio signal to detect the presence a predefined word or expression in the audio signal. Generally, a keyword spotter uses simplified ASR techniques to detect a specific word or a limited number of words rather than attempting to recognize a large vocabulary. For example, a keyword spotter may provide a notification when a specified word is detected in an audio signal, rather than providing a textual or word-based output. A keyword spotter using these techniques may compare different words based on hidden Markov models (HMMs), which represent words as series of states. Generally, an utterance is analyzed by comparing its model to a keyword model and to a background model. Comparing the model of the utterance with the keyword model yields a score that represents the likelihood that the utterance corresponds to the keyword. Comparing the model of the utterance with the background model yields a score that represents the likelihood that the utterance corresponds to a generic word other than the keyword. The two scores can be compared to determine whether the keyword was uttered. Such background model may be user specific, allowing portable music device 112 to identify the user speaking to music device 112 by comparing the model of the utterance to multiple background models with different users and matching the model to a background model. Once portable music device 112 has identified the user, music device 112 can allow different functionalities for such user. For example the user may be allowed to use some features or execute some actions but not others, according to the privileges granted to such user.

In certain embodiments, audio may be streamed to the speech support service server 302 in response to either the talk button 120 being activated or in response to detection of the wakeword. In response to receiving the audio, the speech support service server 302 performs ASR and NLU to determine the meaning of the user speech and to determine an appropriate response.

In some embodiments, local wakeword detection may be used only when the portable music device 112 is connected to and receiving external AC power. When using wakeword detection, audio that is subsequent in time to the utterance of the wakeword is provided to the speech support service server 302. During times in which the portable music device 112 is operating from its internal rechargeable battery 318 and/or battery pack 108B, without connection to external power, wakeword detection may be disabled and audio is provided to the speech support service server 302 only during times when (or after) the talk button 120 is pressed. Disabling the wakeword detection when operating from battery power reduces the computational load of the processor 310 and thereby reduces power consumption of the portable music device 112.

In some embodiments, the speech services 316 may also include ASR functionality 346. In some embodiments, the speech services 316 may also include NLU functionality 348. When these functionalities are present, they may be used in place of the corresponding functionalities provided by the speech support service server 302 during times when the portable music device 112 is receiving external power and/or when music device 112 does not have access to the speech support service server 302 (for example, if access to wide-area network 102 is unavailable). Thus, rather than sending the audio signal 306 to the speech support service server 302, the portable music device 112 may perform ASR and/or NLU internally and may respond to user speech based on the internal or local analysis of captured audio. During times when the portable music device 112 is not connected to external power, audio may be sent to the speech support service server 302 for speech analysis, thereby reducing power consumption of the portable music device 112. The local ASR functionality 346 and NLU functionality 348 may use techniques similar to those used by the ASR service 334 and the NLU service 336 of the speech support service server 302.

In addition to wakeword detection, ASR, and NLU, the portable music device 112 may have other capabilities that are enabled only during those times when the portable music device 112 is receiving external AC power. Limiting usage of these capabilities to these times allows the portable music device 112 to conserve power and to prolong battery life.

FIG. 3 shows an example method 400 that may be implemented by the portable music device 112 to interact with a user for playing audio content or performing other activities in response to spoken user commands. An action 402 detecting which of multiple power states the music device 112 is in. In the described implementation, there are two possible power states. The first power state comprises the state in which the music device 112 is operating solely from battery power and is not receiving external AC electrical power. The second power state comprises the state in which the music device 112 is receiving electrical power from an AC source external to the music device 112, other than the internal battery 318 of the music device 112. Accordingly, the action 402, which may be performed by the power detector 322, comprises detecting whether the music device 112 is in the first power state or the second power state. Detecting that the music device 112 is in the first power state comprises determining that power is not being received from an external AC power source. Detecting that the music device 112 is in the second power state comprises determining that power is being received from an external AC power source.

Alternatively, detecting that the music device 112 is in the first power state comprises determining that power is not being received from an external AC power source or from battery pack 108B. Similarly, detecting that the music device 112 is in the second power state comprises determining that power is being received from an external AC power source or from battery pack 108B.

In other embodiments, the power states may correspond to different conditions. For example, the first power state may correspond to a condition in which the battery pack 108B and/or internal battery 318 of the music device 112 has a charge level that is below a selected threshold. For example, the first power state may correspond to the battery pack 108B and/or internal battery 318 having a charge level below 10%. The second power state may correspond to a condition in which the battery pack 108B and/or internal battery 318 of the music device 112 has a charge level that is above the selected threshold. For example, the second power state may correspond to the battery pack 108B and/or battery 318 having a charge level above 10%.

The music device 112 operates in a first user interaction mode in response to detecting that the music device 112 is operating in the first power state. The music device 112 operates in a second user interaction mode in response to detecting that the music device 112 is in the second power state. A path along the left side of FIG. 3 is followed to implement the first user interaction mode. A path along the right side of FIG. 3 is followed to implement the second user interaction mode.

Operating in the first user interaction mode comprises the actions shown on the left side of FIG. 3. An action 404 comprises detecting actuation of the talk button 120. In response to actuation of the talk button 120, an action 406 is performed of receiving first speech input and generating first microphone audio data corresponding to the first speech input, using the microphone 116 of the music device 112. In operation, the user will speak while or after pressing the talk button 120, and the first microphone audio signal will therefore contain first user speech input that corresponds to a spoken user command. In some cases, the command may specify music that is to be played by the music device 112.

An action 408 comprises sending the first microphone audio data to the speech support service server 302 for analysis, which may include ASR and NLU. For example, the speech support service server 302 may perform ASR and NLU to identify a song that the user has requested to be played by the music device 112. The first microphone audio data may be sent as a digital audio stream over the wide-area network 102 using the WiFi interface 326 of the music device.

An action 410 comprises receiving an indication from the speech support service server 302 of an action to be performed in response to the spoken user command. In some cases, the action 410 may comprise or may include receiving audio data corresponding to or representing the song that the user has requested to be played by the music device 112. For example, the music device 112 may communicate over the wide-area network 102 with a music service using the WiFi interface 326 to receive an audio signal from the music service, where the audio signal contains the song.

An action 412 comprises implementing the action indicated by the speech support service, such as by playing the song that has been identified based on the spoken user command. The song may be played using the speakers 108 of the music device 112.

Operating in the second user interaction mode comprises the actions shown on the right side of FIG. 3. An action 414 comprises detecting a user utterance of a trigger expression. For example, the music device may receive second speech input and may generate audio data representing or corresponding to the second user speech input. The wakeword detection component 344 may monitor the audio data to detect the user utterance of the trigger expression.

In response to detection of the user utterance of the trigger expression, an action 416 is performed of receiving third speech input and may generate audio data representing or corresponding to the third speech input. In use, the user will continue to speak after uttering the trigger expression, and the third audio data will therefore contain user speech input that corresponds to a second spoken user command. In some cases, the second command may specify another song that is to be played by the music device 112.

An action 418 may comprise causing the third audio data to be analyzed to recognize the third user speech and to determine a meaning or intent of the third user speech. In some cases, this may include identifying the song that the user has requested to be played.

In some implementations, causing the third audio data to be analyzed may comprise sending the third audio data to the speech support service server 302 over the wide-area network 102 using the WiFi interface 326 for analysis of the third audio data by the speech support service server 302. In other cases, causing the third audio data to be analyzed may comprise recognizing the user command using speech recognition and/or natural language understanding capabilities of the music device 112 itself.

An action 420 may comprise determining and implementing an action in response to the second user command. In some cases, the action 418 may comprise playing music or a song specified by the second user command. In some cases, the action 418 may comprise receiving audio data from a music service, where the audio data contains the music or song specified by the user command, and may additionally comprise rendering the audio signal to play the music.

In some cases, the portable music device 112 may have a radio-frequency (RF) tuner circuit 117 in order to receive terrestrial, over-the-air broadcasts. Such broadcasts may include AM, FM, digital audio broadcasts (DAB) and/or weather band broadcasts. The portable music device 112 may in some cases receive content from other sources such as cable broadcast systems.

The portable music device 112 may also have an auxiliary input 119 and/or a USB port 323 to receive audio signals from another audio source. Persons skilled in the art will recognize the USB port 323 may be connected to a power supply circuit 319 which receives power from the external AC power or the battery pack 108B and converts it to a 5 volt output as called for in the USB specification.

Persons skilled in the art shall recognize that the portable music device 112 and/or the speech support service server 302 may be configured to interact according to a web services model. Generally, a web service may comprise any type of computing service that is made available to a requesting client via a request interface that includes one or more Internet-based application layer data transport protocols, such as a version of the Hypertext Transport Protocol (HTTP) or another suitable protocol.

The Bluetooth interface 324 of the portable music device 112 may be used by the portable music device 112 to communicate with the tags 107, power tool 108, battery pack 108B, wearable item 109 and/or the construction material 110. The Bluetooth interface 324 may be used to communicate commands, status, and other information between the portable music device 112 and at least one (if not all) of the tags 107, power tool 108, battery pack 108B, wearable item 109 and/or the construction material 110. The Bluetooth interface 324 may be used to receive information from the tags 107, power tool 108, battery pack 108B, wearable item 109 and/or the construction material 110. Portable music device 112 can then communicate such information to cloud service or central server 103.

With such arrangement, the portable music device 112 can query, transmit and/or receive information to/from a computer 300, smartphone 111, tags 107, power tool 108, battery pack 108B, wearable item 109 and/or construction material 110. For example, portable music device 112 can receive data from tags 107 and store such data in the central server 103. (Persons skilled in the art shall recognize that the frequency in which portable music device 112 may upload such data to the central server 103 may be dependent upon whether portable music device 112 is being powered by AC power or battery pack 108B, and/or upon the charge level of battery pack 108B. Accordingly, portable music device 112 may upload the data more frequently when portable music device 112 is being powered by AC power and less frequently if the charge level of battery pack 108B is low.) Alternatively, portable music device 112 can receive instructions from computer 300, central server 103 and/or smartphone 111 to change a parameter of power tool 108 and/or battery pack 108B. Portable music device 112 would wireless communicate with power tool 108 and/or battery pack 108B, exchange data as necessary and cause a processor in power tool 108 and/or battery pack 108B to change the desired parameter. Portable music device 112 can then activate the cellular data network communication circuit 327 and/or satellite data network communication circuit (not shown) to update the data records on the cloud services for power tool 108 and/or battery pack 108B, which could then be seen on computer 300, local server 101, central server 103, and/or smartphone 111, etc.

Portable music device 112 can also wirelessly contact and poll all nearby responsive items, including smartphone 111, tags 107, power tool 108, battery pack 108B, wearable item 109 and/or construction material 110. Portable music device 112 can then activate the cellular data network communication circuit 327 and/or satellite data network communication circuit (not shown) to report all the responsive items located nearby, which can then be seen on the computer 300, central server 103 and/or smartphone 111. Persons skilled in the art shall recognize that, if portable music device 112 has a Global Positioning System (GPS) module 315, portable music device 112 can provide such data when reporting the nearby located items, or in response to a query from the computer 300, central server 103 and/or smartphone 111, etc.

Persons skilled in the art shall recognize that having access to the GPS information is advantageous as such information effectively provides the approximate location of nearby power tools 108, battery packs 108B, wearable items 109 and/or construction materials 110, etc. With such arrangement, the user can program a geographic region via a smartphone 111, central server 103 or computer 300 so that, when the approximate location of a nearby power tool 108, battery pack 108B, wearable item 109 and/or construction material 110, etc. according to the GPS information is within or without the geographic region, a specific action occurs.

For example, the user may program an alarm when a wearable item 109 is within a particular geographic region, will be activated, sound an alarm and/or shut down. Similarly, the user may program that, when a battery pack 108B is outside a particular geographic region, the battery pack 108B will be activated, sound an alarm and/or shut down. Preferably, the user can access a map, define the geographic region by defining the boundaries of the region (possibly by drawing a square on the screen or inputting particular coordinates), selecting the item to monitor, and a resulting action when the item is within or without the geographic region.

Figure 4:
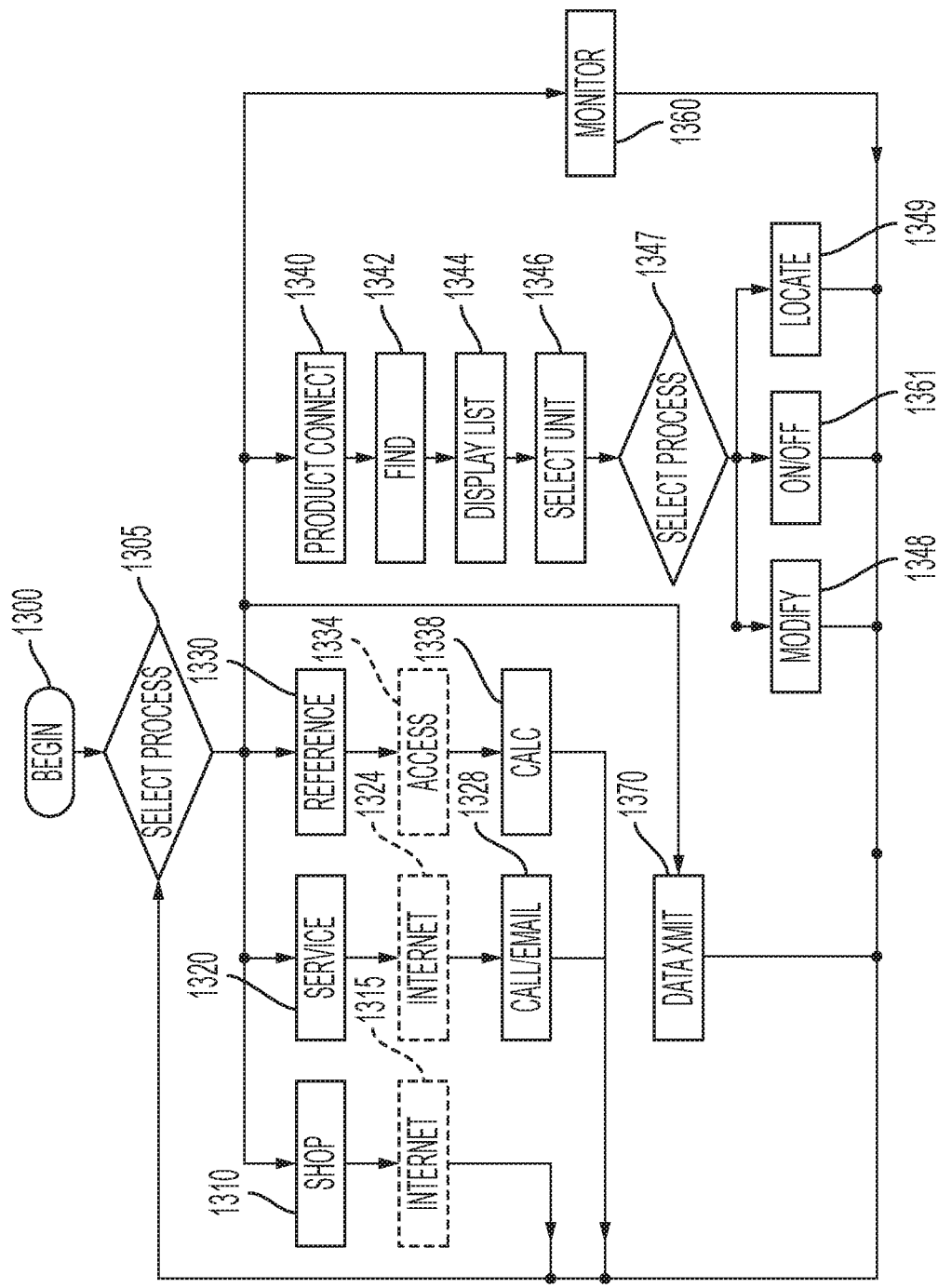
FIG. 4 is a flowchart of different exemplary process that can be performed by the system.

Portable music system 112 may have an operating system 314 app that implements the steps shown in the flowchart of FIG. 4. A user may begin the program at step 1300 by, for example, pressing the talk button 120 and/or speaking a request. In response to such selection, portable music device 112 may offer several process choices for the user to select (step 1305). These process choices may include shopping for tools or related products (step 1310), obtaining service information (step 1320), refer to construction reference materials (step 1330), or connect to nearby power tools or products (step 1340).

For example, if the user selects the shopping process (step 1310), portable music device 112 may communicate with a server via the internet (step 1315) that would provide the user information on the different available products, as well as allow the user to shop online for such products. Persons skilled in the art may recognize that the portable music device 112 may use GPS or cell-location data to identify the closest stores carrying the desired products.

If the user selects the service process (step 1320), portable music device 112 may communicate with a server via the Internet (step 1324) that provides the user information on the different available services, including the closest repair/service center, contact information, etc. Persons skilled in the art may recognize that the portable music device 112 may use GPS or cell-location data to identify the closest repair/service center. The user can then call or email the repair/service center (step 1328) to schedule an appointment. Persons skilled in the art are further referred to U.S. Publication No. 2013/0159038, filed on Dec. 11, 2012, entitled "System and Method for Interacting With Customer," which is fully incorporated herein by reference, for further details on the service process.

Persons skilled in the art will recognize that portable music device 112 may transmit data to the repair/service center about power tool battery pack 108B, power tool 108, etc., such as cycle numbers, clutch activation count, current draw profiles, and other usage data. Such data can be obtained by the portable music device 112 querying battery pack 108B, power tool 108, etc., then receiving the data from the battery pack 108B, power tool 108, etc., and then transmitting the data to the repair/service center.

Similarly, portable music device 112 can transmit such data to other destinations, such as a supervisor's computing device, to alert the supervisor of a user's use or abuse of a battery pack 108B, power tool 108, etc. Such data can be used to monitor the user's productivity.

Persons skilled in the art will recognize that the portable music device 112 could be used to record noises originating from power tool 108 and send those noises to the repair/service center for diagnosis of the power tool 108. The app could also analyze the noises and provide some troubleshooting advice for power tool 108.

If the user selects the reference process (step 1330), the app would access data stored in memory or stored in the internet (step 1334). Persons skilled in the art will recognize that the memory could be within or without portable music device 112. Such data could include reference materials, such as handbooks on different construction techniques, the different construction codes, such as the International Building Code, the International Residential Code, the International Plumbing Code, etc., as well as computer-aided design (CAD) data and/or building information modeling (BIM) data models of the worksite. The data could also include other executable routines, like calculator code for converting measurements between different units (e.g., converting feet to meters), calculating stair rise run, baluster spacing, roof pitches, HVAC calculations, etc., as well as different cost estimation tools, landscaping tools, etc.

The user can also choose to connect/pair to nearby power tools, battery packs or other products (step 1340). If such process is selected, portable music device 112 would proceed to wirelessly contact all nearby power tools, battery packs and other products (step 1342). Once contact has been made, portable music device 112 would display a list of nearby power tools, battery pack and other products (step 1344).

It may be preferable to color-code the different listed power tools, battery pack and other products. For example, tools that are owned (or paired) with the user can be shown in green. Tools that can't be contacted or accessed by the user can be shown in red. Tools that are owned by colleagues or a group are shown in yellow. Tools that have not been associated with a particular user can be shown in white.

Similarly, persons skilled in the art will recognize that portable music device 112 may show a list of previously-paired power tools, power tool battery packs and other products, and show the ones that are nearby in one color, while showing the others in another color. In this manner, the user will know which power tools, power tool battery packs and other products are within a certain radius, thus conducting a quick inventory check.

The user can then select a particular power tool, battery pack or other item (step 1346). Once a particular item is selected, portable music device 112 can display different attributes for such product for review. For example, in the case of battery pack 108, some of the attributes can include an identifying name (e.g., "Danny's Pack 1"), a picture icon, device model, the charge status, password (for accessing the tool information through another user's phone), temperature, number of charge cycles, etc. Persons skilled in the art will recognize that this information is kept in a memory within the item, which is then transmitted to portable music device 112, possibly upon a direct request from portable music device 112.

Persons skilled in the art will recognize that some of the attributes can be modified. For example, the identifying name and the picture icon can be modified by the user by selecting a modification process (steps 1347, 1348) and inputting the new information. This data can then be wirelessly transmitted to the power tool 108 or other item for storage within a memory (not shown). Persons skilled in the art will recognize that the user can input the new information (as well as other commands, etc.) via a keyboard or touch-screen 112T in portable music device 112 and/or by giving verbal commands which are recognized by the portable music device 112.

In addition to modifying data related to the identification of the battery pack 108B, for example, a user can modify data related to the performance of battery pack 108B via portable music device 112. For example, the user may want to change a temperature threshold at which battery pack 108B cut offs output power. In other words, rather than cutting off power when the battery pack 108B has a temperature of 100°, the user may wish to change the cut off temperature to 110°.

To do so, the user may verbally input the desired cut off temperature into portable music device 112. Portable music device 112 wirelessly sends that data to battery pack 108B.

The user may also request the portable music device 112 to announce when the associated battery pack 108B is at full charge. This announcement can be communicated via sound emitted by the portable music device 112 and/or by flashing LED(s) 112L and/or showing a message on display 112D.

Similarly, the user can request portable music device 112 to announce when battery pack 108B is near discharge, when it is hot, etc. Persons skilled in the art will recognize that this can be accomplished by portable music device 112 querying battery pack 108B. Such data can then be transmitted to portable music device 112 for display and/or announcement. This announcement can be communicated via sound emitted by the portable music device 112 and/or by flashing LED(s) 112L and/or showing a message on display 112D.

The user can also request portable music device 112 to disable and/or enable) the power tool 108 and/or battery pack 108B via portable music device 112. Persons skilled in the art will recognize that this can be accomplished by portable music device 112 sending an enabling/disabling instruction to power tool 108 and/or battery pack 108B. Persons skilled in the art will recognize that this could effectively function as a remote on/off switch (step 1361).

Similarly, a power tool 108 and/or chargers 210 may also be contacted via portable music device 112. For example, power tool 108 can store tool usage patterns, tool conditions, etc., which can be transmitted to portable music device 112 and to a server for further analysis, etc. As disclosed above, portable music device 112 can display such information. For example, portable music device 112 can display the speed (rpm), bevel angles, miter angles, brush wear, the presence or condition of a guard and/or attachment, etc. of the power tool 108.

Like battery pack 108B, power tool 108 may effectively be programmed to change different attributes or features. For example, a user can set the maximum motor speed or power, or provide a predetermined output (such as half the motor speed or power) when not within the vicinity of portable music device 112, etc. Similarly, it may be desirable to control any adjustable feature in a power tool 108B via portable music device 112. For example, the portable music device 112 may adjust output pressure in compressors, the amount of grease outputted by a grease gun when the trigger is pulled (persons skilled in the art will recognize that portable music device 112 can set a grease gun's pump to run for X pump cycles whenever the trigger is pulled; the higher the number of pump cycles per trigger pull, the larger the amount of grease outputted), the speed of a flywheel-based nailer (such as the one disclosed in U.S. Pat. No. 7,137,541, which is wholly incorporated herein by reference) in order to adjust for a different nail size or material in which the nail is being driven into, or a desired temperature for a heated jacket (such as the one disclosed in US Publication No. 2011/0108538, which is wholly incorporated herein by reference). Such data can be transmitted by portable music device 112 to power tool 108. The user may be required to press a button and/or pull a trigger on power tool 108 prior to altering or enacting the desired parameter.

The user can also enable and disable different modes of operation, such as allowing/not allowing power tool 108 to rotate in a reverse direction. As mentioned above, the user can enter such commands via buttons 112K or touchscreen 112T on portable music device 112 and/or by providing verbal commands recognized by portable music device 112.

Portable music device 112 may also be used to modify the different trigger profiles of power tool 108 as described in US Publication No. 2011/02544272, filed on Apr. 7, 2011, entitled "Power Tool Having a Non-Linear Trigger-Speed Profile," which is hereby fully incorporated by reference. A user can use portable music device 112 to select between the different trigger profiles applicable to power tool 108. Such data would be sent to power tool 108, which would then save this instruction in a memory (not shown).

Other customizable features on power tools and other products may include the blink patterns of LEDs, the time period that an LED remains on after releasing a trigger switch, and/or audio beeping patterns for particular conditions in products with speakers or piezos, etc. The portable music device 112 can also turn on and off the power tool 108 or accessories thereof like a dust collector, open/close gates therein, etc.

If the power tool 108 has servos that can be used to adjust different features of power tool 108 (such as the miter saw disclosed in US Patent Publication No. 2001/0000856, filed on Jan. 5, 2001, and wholly incorporated herein by reference), the portable music device 112 can be used to adjust the different features by controlling the servos. For example, the user can request a bevel angle on the portable music device 112 and the portable music device 112 will control the bevel angle servo to the desired location. In this manner, the user can program a list of desired workpieces, i.e., a cut list, and the app can control the miter saw/power tool 108 to obtain those cuts. Similarly, the servos can be used to adjust the stroke length in a saw that allows for such adjustment, such as in reciprocating saws or jigsaws.

It may be beneficial to provide servos to perform functions that are difficult to do, like opening a blade clamp on a grinder or a recip saw. Rather than requiring the user to torque open a blade clamp, the user would request such operation from the portable music device 112.

Furthermore, a user can also use portable music device 112 to locate the selected power tool 108, battery pack 108B or other product (step 1349). Portable music device 112 can send a command the selected power tool 108, battery pack 108B or other product to start emitting a sound and/or light up or flash an LED.

It is also possible to have the portable music device 112 poll all nearby battery packs 108B for a particular state. Thus portable music device 112 can determine the battery pack 108B with the highest/lowest charge, highest/lowest temperature, most charge cycles, etc., then send a command to the corresponding battery pack 108 to start emitting a sound.

The user can request portable music device 112 to monitor the battery pack 108B and/or power tool 108 (step 1360). During this monitoring process, the portable music device 112 can keep track of power tool usage, present current draw, data received from sensors in the power tool 108 (for example pressure sensors disposed within the power tool 108), etc. and store and/or use that information for analysis by a service department. In this manner, the service department can determine whether a power tool 108 has been abused.

Persons skilled in the art will recognize that the user can request portable music device 112 to monitor all nearby items, such as battery packs 108B and/or power tools 108. The user can then press a button on battery packs 108B and/or power tools 108 and/or pull a trigger on power tool 108. Portable music device 112 can then identify the particular battery pack 108B and/or power tool 108 by announcing "Danny's pack 001 has been activated"). The user can request portable music device 112 to monitor that particular item.

The portable music device 112 can use the monitored information to better utilize the power tool 108. For example, the portable music device 112 can receive PWM, voltage and/or current draw information from battery pack 108B and/or power tool 108 and establish a macro that would allow the user to repeat the current draw. Persons skilled in the art will recognize that such current draw profile can represent a torque curve for driving a fastener into a surface. Having a repeatable draw profile will allow the user to easily set a custom torque setting.

Portable music device 112 can monitor a particular parameter during an operation to determine whether an operation was successful. For example, portable music device 112 can monitor the motor current draw in power tool 108 during a crimping operation, as described in US Publication No. 2018/01311151, which is hereby fully incorporated by reference. If a crimp operation is not completed properly, portable music device 112 can announce that the crimp operation was not properly completed.

Persons skilled in the art will recognize that portable music device 112 can be used as a gateway for forwarding data and/or audio (step 1370). For example, portable music device 112 may be used as a VOIP terminal, sending audio data to the internet 102. Similarly, a user may request portable music device 112 to send an email or text message to a person or terminal. Such request would be interpreted by support service server 302 and acted upon accordingly.

It will be understood that the above description and the drawings are examples of particular implementations of the invention, but that other implementations of the invention are included in the scope of the claims.

What is claimed is:

1. A first electronic device, comprising:
  at least one microphone;
  at least one speaker;
  one or more processors;
  a power tool battery pack connectable to and powering the at least one speaker and the one or more processors; and
  one or more computer-readable media storing instructions that, when executed by the one or more processors, cause the one or more processors to perform operations comprising:
    causing the first electronic device to operate in a first mode;
    generating, while the first electronic device is operating in the first mode, first audio data representing user speech captured by the at least one microphone;

causing the first audio data to be analyzed;
determining that the first electronic device is communicatively coupled to a second electronic device;
causing, based at least in part on determining that the first electronic device is communicatively coupled to the second electronic device, the first electronic device to switch from operating in the first mode to operating in a second mode;
receiving, while the first electronic device is operating in the second mode, second audio data from the second electronic device; and
outputting, using the at least one speaker, audible content represented by the second audio data.

2. The first electronic device of claim 1, the operations further comprising:
determining that the first electronic device is communicatively coupled to one or more remote computing devices,
wherein causing the first electronic device to operate in the first mode is based at least in part on determining that the first electronic device is communicatively coupled to the one or more remote computing devices.

3. The first electronic device of claim 1, the operations further comprising:
determining that the first electronic device is not communicatively coupled to one or more remote computing devices,
wherein causing the first electronic device to switch from operating in the first mode operating in the second mode is further based at least in part on determining that the first electronic device is not communicatively coupled to the one or more remote computing devices.

4. The first electronic device of claim 1, wherein causing the first audio data to be analyzed comprises sending the first audio data to one or more remote computing devices, and wherein the operations further comprise:
receiving third audio data from the one or more remote computing devices, wherein the third audio data is based at least in part on the first audio data; and
outputting, using the at least one speaker, additional audible content represented by the third audio data.

5. The first electronic device of claim 1, wherein causing the first audio data to be analyzed comprises:
analyzing the first audio data to identify one or more words within the user speech; and
identifying third audio data based at least in part on analyzing the first audio data, and
wherein the operations further comprise outputting, using the at least one speaker, additional audible content represented by the third audio data.

6. The first electronic device of claim 1, the operations further comprising:
identifying third audio data based at least in part on causing the first audio data to be analyzed; and
sending the third audio data to the second electronic device.

7. The first electronic device of claim 1, the operations further comprising:
determining that the first electronic device is not communicatively coupled to the second electronic device, wherein causing the first electronic device to operate in the first mode is based at least in part on determining that the first electronic device is not communicatively coupled to the second electronic device.

8. The first electronic device of claim 1, wherein the first mode includes a voice-controlled mode where the first electronic device communicates with one or more remote computing devices configured to analyze generated audio data; and
the second mode includes a peripheral mode where the first electronic device communicates with the additional electronic device.

9. A method comprising:
Providing a first electronic device connectable to and powerable by a power tool battery pack;
determining that a first electronic device is operating in a first mode;
while the first electronic device is operating in the first mode:
generating first audio data representing sound captured by at least one microphone of the first electronic device;
sending the first audio data to one or more remote computing devices; and
receiving, from the one or more remote computing devices, at least one of second audio data or information for acquiring the second audio data;
determining that the first electronic device is operating in a second mode;
receiving, while the first electronic device operating in the second mode, third audio data from a second electronic device; and
outputting audible content represented by the third audio data.

10. The method of claim 9, further comprising:
determining that the first electronic device is communicatively coupled to the one or more remote computing devices; and
operating the first electronic device in the first mode based at least in part on determining that the first electronic device is communicatively coupled to the one or more remote computing devices.

11. The method of claim 9, further comprising:
determining that the first electronic device is not communicatively coupled to the one or more remote computing devices; and
operating the first electronic device in the second mode based at least in part on determining that the first electronic device is not communicatively coupled to the one or more remote computing devices.

12. The method of claim 9, further comprising:
determining that the first electronic device is communicatively coupled to the second electronic device; and
operating the first electronic device in the second mode based at least in part on determining that the first electronic device is communicatively coupled to the second electronic device.

13. The method of claim 9, further comprising sending the second audio data to at least one of the second electronic device or a third electronic device.

14. The method of claim 9, further comprising:
determining that the first electronic device is communicatively coupled to the one or more remote computing devices;
operating the first electronic device in the first mode based at least in part on determining that the first electronic device is communicatively coupled to the one or more remote computing devices;
at least partly after generating the first audio data, determining that the first electronic device is not communicatively coupled to the one or more remote computing devices; and operating the first electronic device in the second mode based at least in part on determining that the first electronic device is not communicatively coupled to the one or more remote computing devices.

15. A first electronic device, comprising:
a power tool battery pack connectable to and powering the one or more processors;
one or more processors; and
one or more computer-readable media storing instructions that, when executed by the one or more processors, cause the one or more processors to perform operations comprising: operating the first electronic device in a first mode;
generating, while operating the first electronic device in the first mode, first audio data representing user speech;
determining that the first electronic device is not communicatively coupled to one or more remote computing devices;
causing, based at least in part on determining that the first electronic device is not communicatively coupled to the one or more remote computing devices, the first electronic device to switch from operating in the first mode to operating in a second mode;
receiving, while operating the first electronic device in the second mode, second audio data from a second electronic device; and
outputting audible content represented by the second audio data.

16. The first electronic device of claim 15, the operations further comprising:
determining that the first electronic device is communicatively coupled to the one or more remote computing devices,
wherein operating the first electronic device in the first mode is based at least in part on determining that the first electronic device is communicatively coupled to the one or more remote computing devices.

17. The first electronic device of claim 15, the operations further comprising:
determining that the first electronic device is communicatively coupled to the second electronic device,
wherein operating the first electronic device in the second mode is further based at least in part on determining that the first electronic device is communicatively coupled to the second electronic device.

18. The first electronic device of claim 15, the operations further comprising:
sending the first audio data to the one or more remote computing devices;
receiving third audio data from the one or more remote computing devices based at least in part on sending the first audio data; and
sending the third audio data to the second electronic device.

19. The electronic device of claim 18, the operations further comprising outputting audible content represented by the third audio data.

20. The first electronic device of claim 15, wherein:
the first mode includes a voice-controlled mode where the first electronic device communicates with the one or more remote computing devices configured to analyze generated audio data; and
the second mode includes a peripheral mode where the first electronic device communicates with the second electronic device.

* * * * *